(12) United States Patent
Lee et al.

(10) Patent No.: US 8,695,525 B2
(45) Date of Patent: Apr. 15, 2014

(54) UNDERWATER ROBOT

(75) Inventors: Pei-Jun Lee, New Taipei (TW);
Han-Chang Tseng, Kaohsiung (TW)

(73) Assignee: National Chi Nan University, Nantou (TW)

( * ) Notice: Subject to any disclaimer, the term of this patent is extended or adjusted under 35 U.S.C. 154(b) by 207 days.

(21) Appl. No.: 13/333,807

(22) Filed: Dec. 21, 2011

(65) Prior Publication Data

US 2012/0298030 A1    Nov. 29, 2012

(30) Foreign Application Priority Data

May 24, 2011   (TW) .............................. 100118112 A (51) Int. Cl.
*B63G 8/00*    (2006.01)

(52) U.S. Cl.
USPC ......................................................... 114/312

(58) Field of Classification Search
USPC ................................................ 114/312, 315
See application file for complete search history.

(56) References Cited

U.S. PATENT DOCUMENTS

| 2004/0079272 A1* | 4/2004 | Mah ............................. 114/315 |
| 2007/0093279 A1* | 4/2007 | Janik ......................... 455/569.1 |
| 2011/0295447 A1* | 12/2011 | Hung et al. ...................... 701/2 |

FOREIGN PATENT DOCUMENTS

| JP | 2005-177065 A | 7/2005 |
| TW | M303760 | 1/2007 |

OTHER PUBLICATIONS

TIPO Search Report of TW Patent Application No. 100118112, issued Aug. 14, 2013, and English Translation (2 pages).

* cited by examiner

*Primary Examiner* — Stephen Avila
(74) *Attorney, Agent, or Firm* — Christie, Parker & Hale, LLP (57) ABSTRACT

An underwater robot is configured to be charged in response to a charging signal from a charging dock, and includes a main body having a waterproof chamber, and an electric power unit disposed in the waterproof chamber. The electric power unit includes a rechargeable battery set storing electric power, and a charging module coupled to the rechargeable battery set and configured to charge the rechargeable battery set in response to the charging signal from the charging dock.

15 Claims, 9 Drawing Sheets

UNDERWATER ROBOT

CROSS-REFERENCE TO RELATED APPLICATION

This application claims priority of Taiwanese Application No. 100118112, filed on May 24, 2011.

BACKGROUND OF THE INVENTION

1. Field of the Invention

The present invention relates to an underwater robot, more particularly to a self-charging underwater robot with information display functionality.

2. Description of the Related Art

There is a conventional underwater robot including a battery disposed in a waterproof chamber, a propulsion unit disposed on the main body for generating a propulsion force to make the conventional underwater robot move underwater, and a control unit coupled to the battery and the propulsion unit. The control unit is operable to provide electric power from the battery to the propulsion unit and to control operation of the propulsion unit. For example, the conventional underwater robot may be in a form of a robotic fish capable of swimming in an aquarium for decorative purpose.

When the battery is out of electrical power, a user has to take the conventional underwater robot out of the aquarium for replacing the battery with a new one. However, it will be difficult to perform the replacement of the battery since it is hard to avoid getting the user's hand wet when the user takes the conventional underwater robot out of the aquarium. Moreover, it is inconvenient to replace the battery since the battery is disposed in the waterproof chamber and the user has to open and access the waterproof chamber.

SUMMARY OF THE INVENTION

Therefore, an object of the present invention is to provide a self-charging underwater robot.

Accordingly, an underwater robot of this invention is configured to be charged in response to a charging signal from a charging dock. The underwater robot comprises a main body including a waterproof chamber, an electric power unit disposed in the waterproof chamber, a propulsion unit disposed on the main body, and a control unit disposed in the waterproof chamber.

The electric power unit includes a rechargeable battery set storing electric power, and a charging module coupled to the rechargeable battery set and configured to charge the rechargeable battery set in response to the charging signal from the charging dock. The propulsion unit is configured to generate a propulsion force to make the underwater robot move underwater. The control unit is coupled to the electric power unit and the propulsion unit, and is operable to provide the electric power from the electric power unit to the propulsion unit and to control operation of the propulsion unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
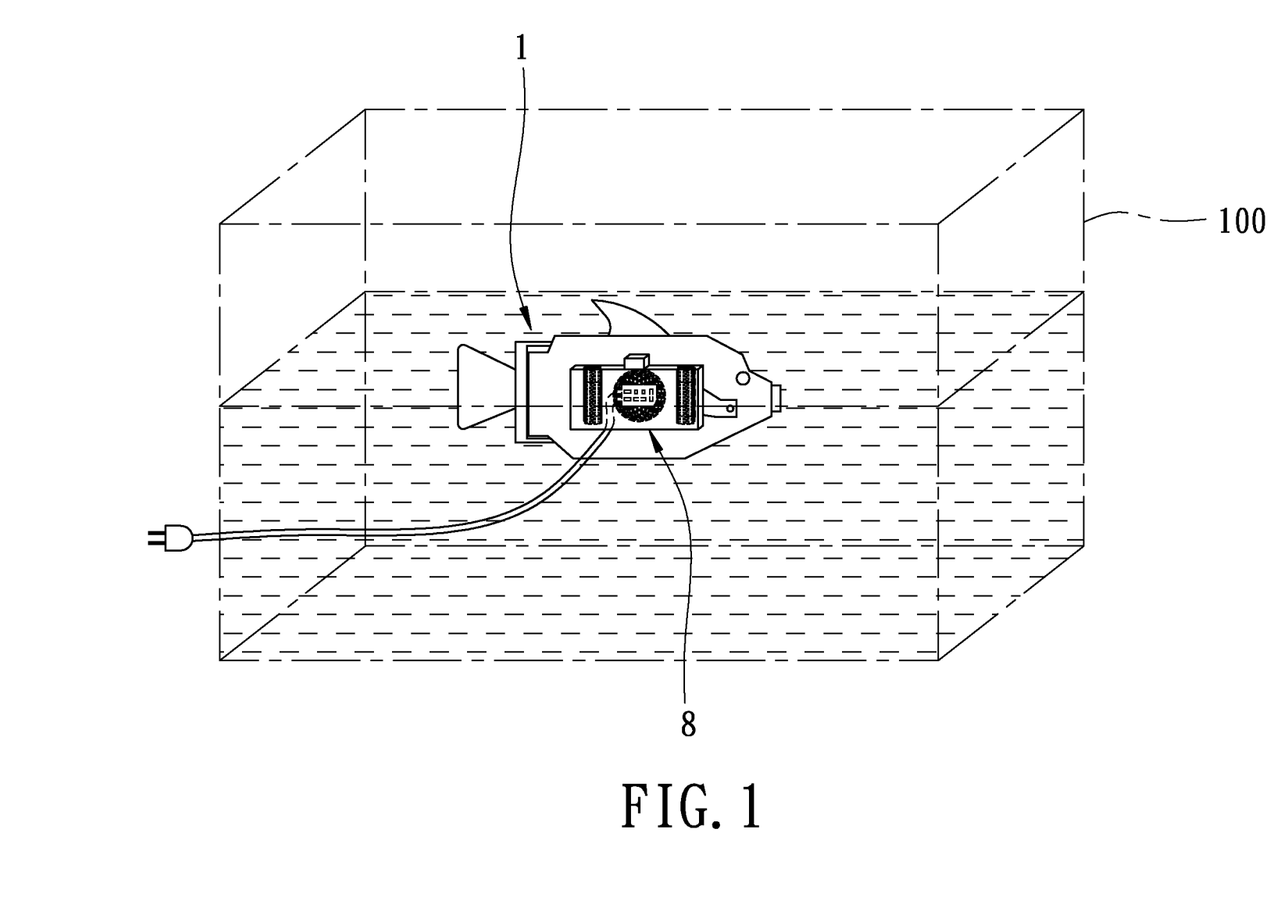
FIG. 1 is a schematic diagram illustrating a first preferred embodiment of an underwater robot system of this invention.
Figure 2:
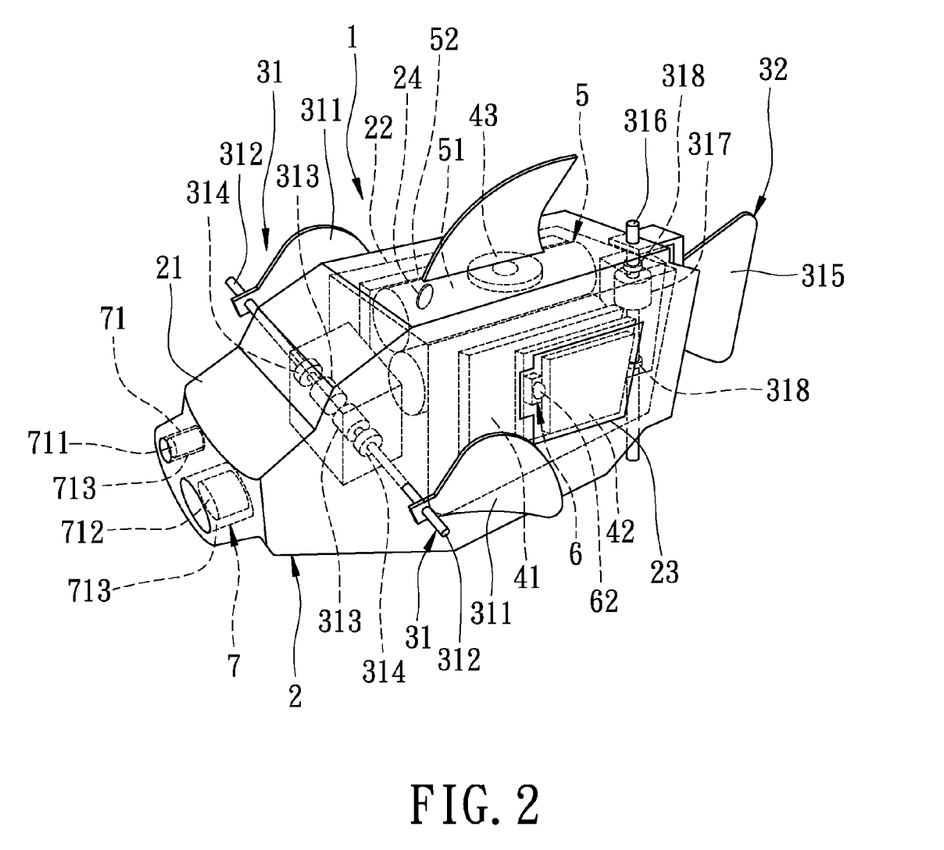
FIG. 2 is a perspective view of an underwater robot of the underwater robot system of the first preferred embodiment.
Figure 3:
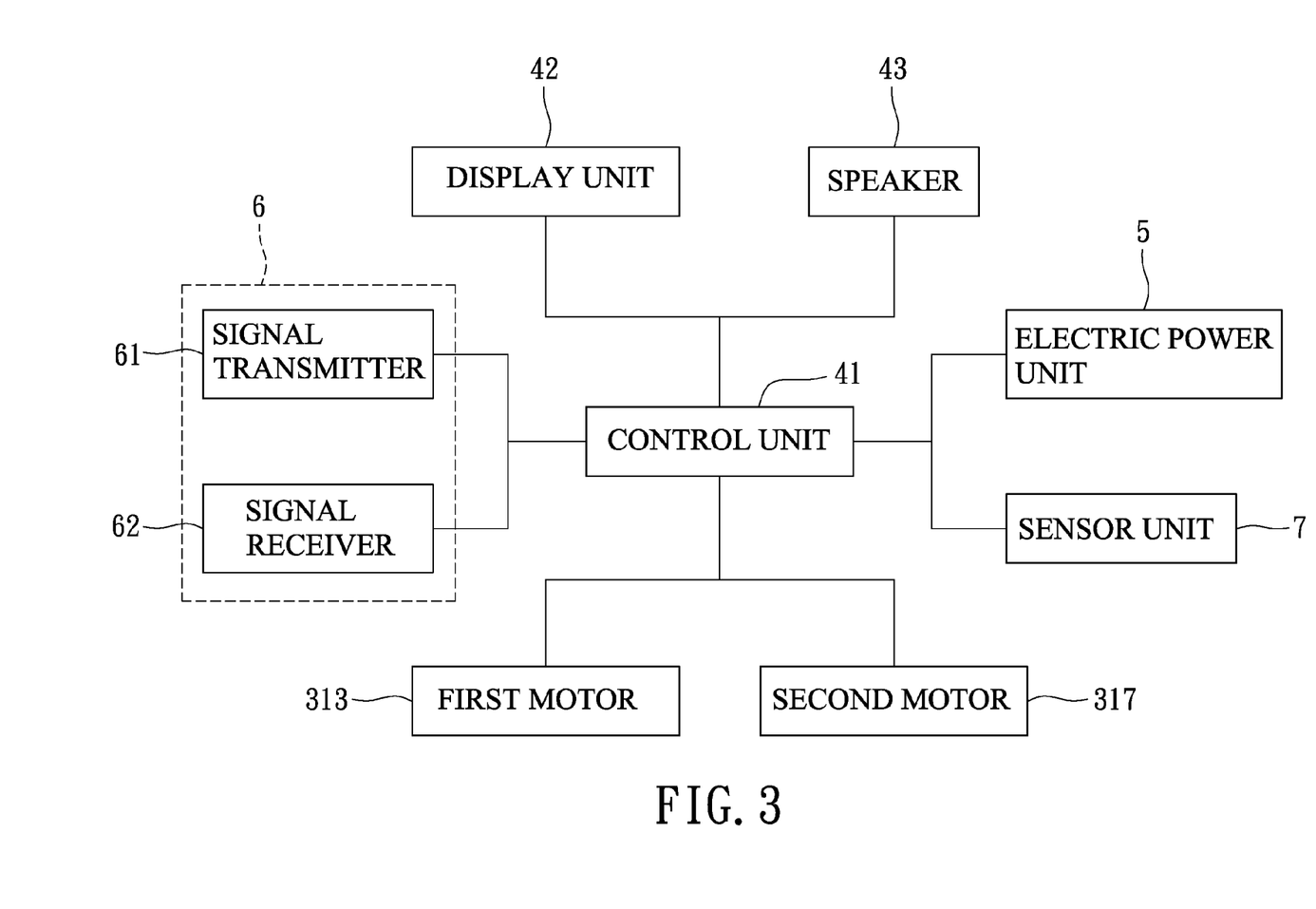
FIG. 3 is a block diagram illustrating electronic components of the underwater robot of the first preferred embodiment.

Referring to FIGS. 1 to 3, the first preferred embodiment of an underwater robot system according to this invention includes an underwater robot 1 and a charging dock 8. In this embodiment, the underwater robot 1 is in a form of a robotic fish configured to swim in an aquarium 100, and the charging dock 8 is mounted to an outer side of the aquarium 100.

The underwater robot 1 includes a main body 2, a propulsion unit 3, a control unit 41, a display unit 42, an electric power unit 5, a signal transceiving unit 6, and a sensor unit 7.

The main body 2 includes a housing 21 and a waterproof chamber 22 that is made of a transparent material. In this embodiment, the housing 21 is in a fish shape and includes a transparent display section 23 disposed at one side of a middle part of the housing 21, and a transparent signal transmitting section 24 disposed at the other side of the middle part of the housing 21.

It should be appreciated that, in other embodiments, the underwater robot 1 may present a different appearance (such as other underwater creatures) if the housing 21 is designed as a corresponding shape.

The propulsion unit 3 is configured to generate a propulsion force to make the underwater robot 1 move underwater, and includes a pair of pectoral fin modules 31 disposed respectively at two outer sides of the housing 21 and a caudal fin module 32 disposed at a rear end part of the housing 21. Each of the pectoral fin modules 31 includes a first motor 313 disposed in the waterproof chamber 22, a first shaft 312 connected to and driven by the first motor 313 to rotate, a first oil seal 314 disposed between the first shaft 312 and the waterproof chamber 22, and a pectoral fin 311 connected to and driven by the first shaft 312 to rotate with respect to the housing 21. The caudal fin module 32 includes a second motor 317 disposed in a rear part of the waterproof chamber 22, a second shaft 316 connected to and driven by the second motor 317 to rotate, a pair of second seals 318 disposed respectively between an upper end of the second shaft 316 and the waterproof chamber 22 and between a lower end of the second shaft 316 and the waterproof chamber 22, and a caudal fin 315 connected to and driven by the second shaft 316 to sway with respect to the housing 21.

The control unit 41 is disposed in the waterproof chamber 22 and is electrically connected to the first and second motors 313, 317 of the propulsion unit 3, the display unit 42, the electric power unit 5, the signal transceiving unit 6, and the sensor unit 7. The display unit 42 is disposed in the waterproof chamber 22 at a location corresponding to the transparent display section 23. The control unit 41 is operable to provide electric power stored by the electric power unit 5 to the first and second motors 313, 317, to control operation of the first and second motors 313, 317, and to control the display unit 42 to display information, such as a calendar, a clock, a note, a picture, a video, etc. In this embodiment, the underwater robot 1 further includes a speaker 43 electrically connected to and configured to be controlled by the control unit 41 to generate sound.

Referring to FIGS. 2 to 5, the electric power unit 5 is disposed in the waterproof chamber 22, and includes a rechargeable battery set 51, a transformation circuit 52 electrically connected to the rechargeable battery set 51 and the control unit 41, a charging module 53 electrically connected to the transformation circuit 52, and a pair of magnetic components 54. The charging module 53 is configured to charge the rechargeable battery set 51 in response to a charging signal from the charging dock 8. The magnetic components 54 are permanent magnets with different magnetic poles.

Figure 5:
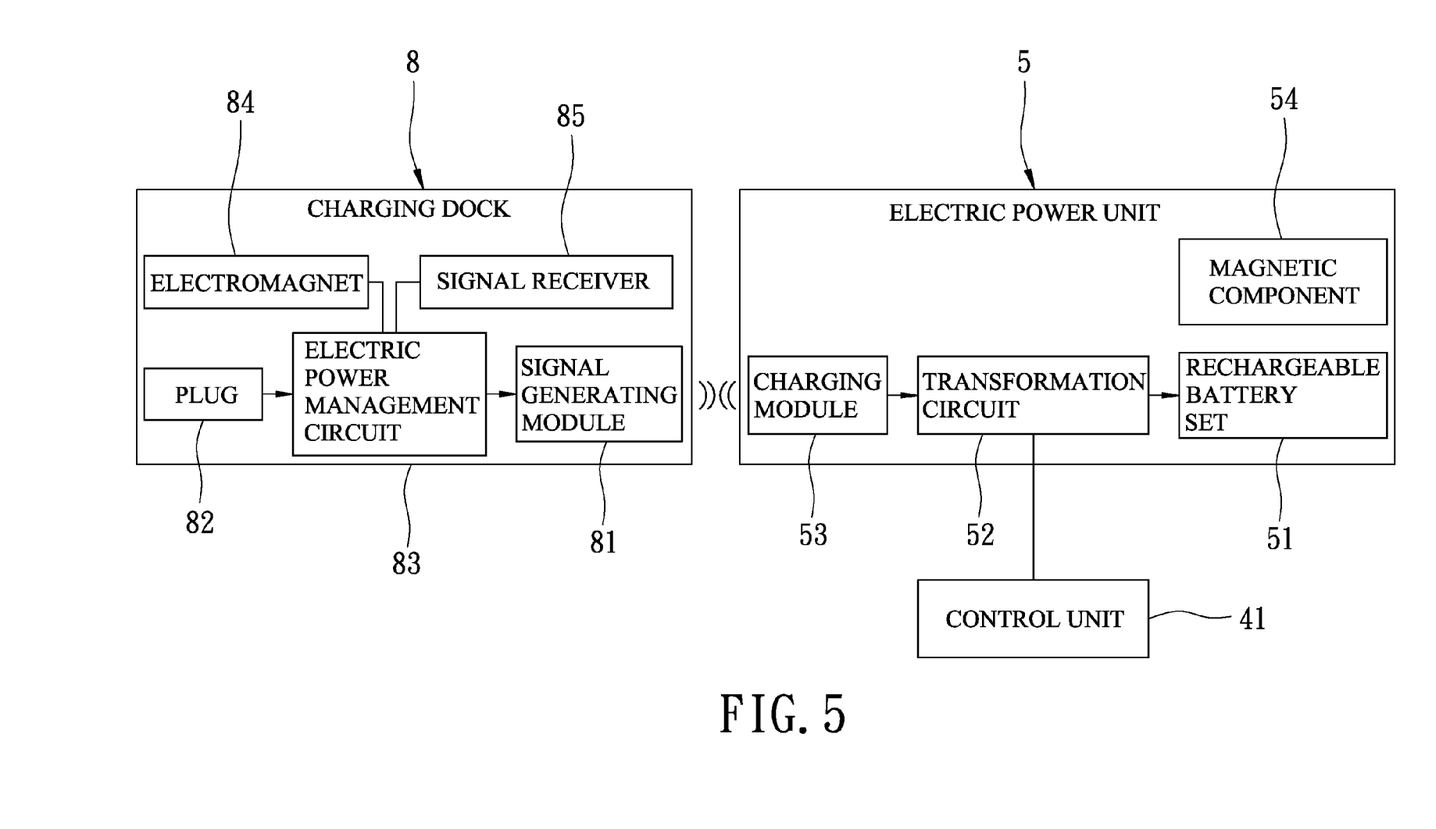
FIG. 5 is a block diagram of the electric power unit coupled to a charging dock.
Figure 6:
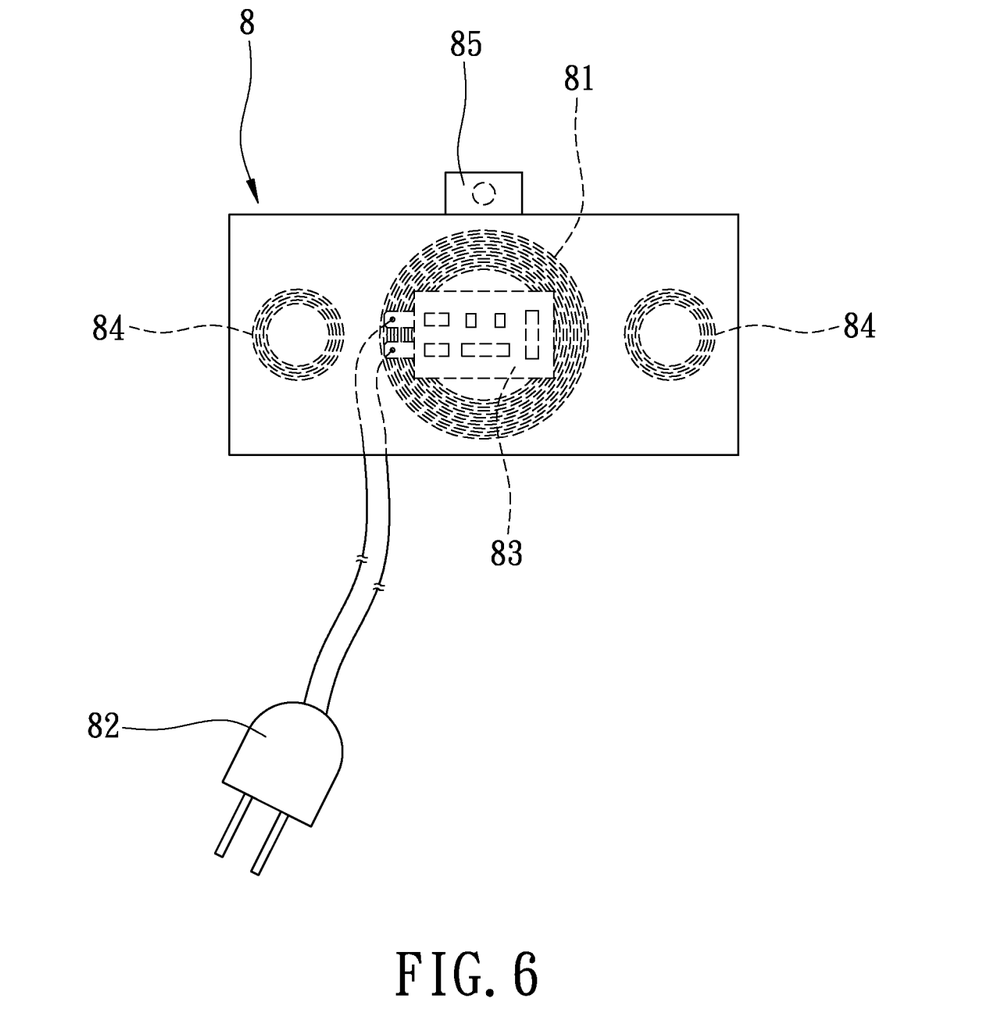
FIG. 6 is a schematic diagram of the charging dock.

Referring to FIGS. 5 and 6, the charging dock 8 includes a signal generating module 81 configured to generate the charging signal, a plug 82 for electrical connection with a socket, an electric power management circuit 83 electrically connected between the signal generating module 81 and the plug 82, and a pair of electromagnets 84 and a signal receiver 85 that are electrically connected to the electric power management circuit 83. The electric power management circuit 83 is operable to process an electric current received from a socket through the plug 82, and to provide the processed electric current to the signal generating module 81, the electromagnets 84 and the signal receiver 85.

In this embodiment, the signal generating module 81 is a coil configured to generate a magnetic field serving as the charging signal in response to receipt of the processed electric current from the electric power management circuit 83, and the charging module 53 of the electric power unit 5 is also a coil configured to generate an induced current from the magnetic field generated by the signal generating module 81 of the charging dock 8. The electromagnets 84 have different magnetic poles and are activated when the electric power management circuit 83 provides the processed electric current thereto. Thus, the magnetic components 54 of the electrical power unit 5 are attracted magnetically and respectively by the electromagnets 84 so as to position the underwater robot 1 with respect to the charging dock 8 in such a manner that the charging module 53 of the electric power unit 5 is adjacent to the signal generating module 81 of the charging dock 8 in a particular direction. Then, the charging module 53 of the electric power unit 5 generates the induced current (alternating current) from the magnetic field generated by the signal generating module 81, and the transformation circuit 52 is operable to transform the induced current to a charging current (direct current) for charging the rechargeable battery set 51. It should be noted that, in other embodiments, the charging dock 8 may include only one electromagnet 84 configured to generate relatively greater magnetic force, and the electric power unit 5 of the underwater robot 1 may correspondingly include only one magnetic component 54.

Figure 4:
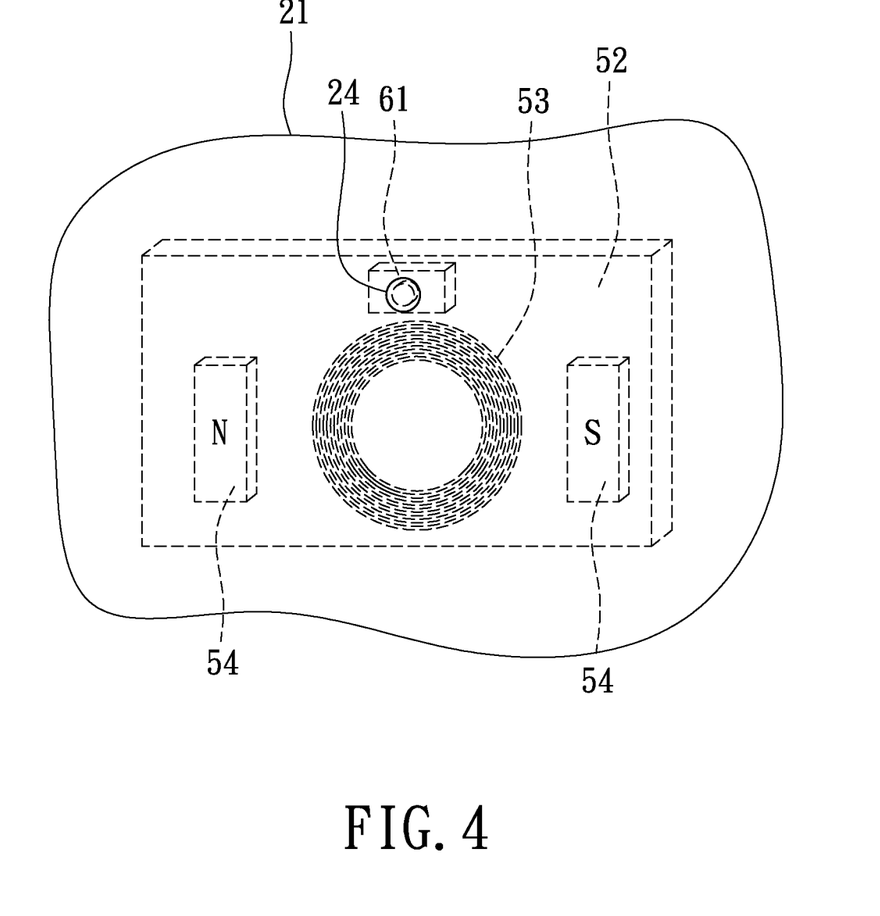
FIG. 4 is a schematic diagram of an electric power unit of the underwater robot of the first preferred embodiment.

Referring to FIGS. 2 to 4, the signal transceiving unit 6 is disposed in the waterproof chamber 22, and includes a signal transmitter 61 and a signal receiver 62 that are electrically connected to the control unit 41 and that are, for example, an infrared transmitter and an infrared receiver, respectively. The signal receiver 62 is disposed adjacent to the display unit 42, and is configured to receive external information and to send the information to the control unit 41 that is operable to control the display unit 42 to display the information. The signal transmitter 61 is disposed at a location corresponding to the transparent signal transmitting section 24 of the housing 21. The control unit 41 is operable to detect a remaining amount of the electric power stored by the rechargeable battery set 51, and to control the signal transmitter 61 to send a notifying signal for reception by the signal receiver 85 of the charging dock 8 and for notifying the signal generating module 81 of the charging dock 8 to generate the charging signal when the remaining amount of the electric power stored by the rechargeable battery set 51 is lower than a predetermined value. The signal receiver 85 is also an infrared receiver in this embodiment. It should be noted that the signal transmitter 61 and the charging module 53 of the electric power unit 5 are disposed at the same side in the waterproof chamber 22 of the main body 2 such that the signal receiver 85 of the charging dock 8 can receive the notifying signal with a relatively greater intensity from the signal transmitter 61 of the signal transceiving unit 6 during a self-charging procedure of the underwater robot 1.

The sensor unit 7 is electrically connected to the control unit 41, and is configured to detect whether there is an obstacle in front of the underwater robot 1 and to send a detection signal to the control unit 41. Accordingly, the control unit 41 is operable to control operation of the propulsion unit 3 to avoid the obstacle according to the detection signal. The sensor unit 7 is an ultrasonic module 71 including a transmitter 711 and a receiver 712, and includes a waterproofing layer 713 that is disposed on the transmitter 711 and the receiver 712 and that has an acoustical transmission coefficient equal to acoustical transmission coefficient of water. As a result, a sonic wave transmitted by the transmitter 711 and a reflected sonic wave received by the receiver 712 that are used for detecting whether there is an obstacle will not be refracted when passing through the waterproofing layer 713. That is to say, the waterproofing layer 713 will not affect transmission efficiency of the transmitter 711 and reception efficiency of the receiver 712.

Figure 7A:
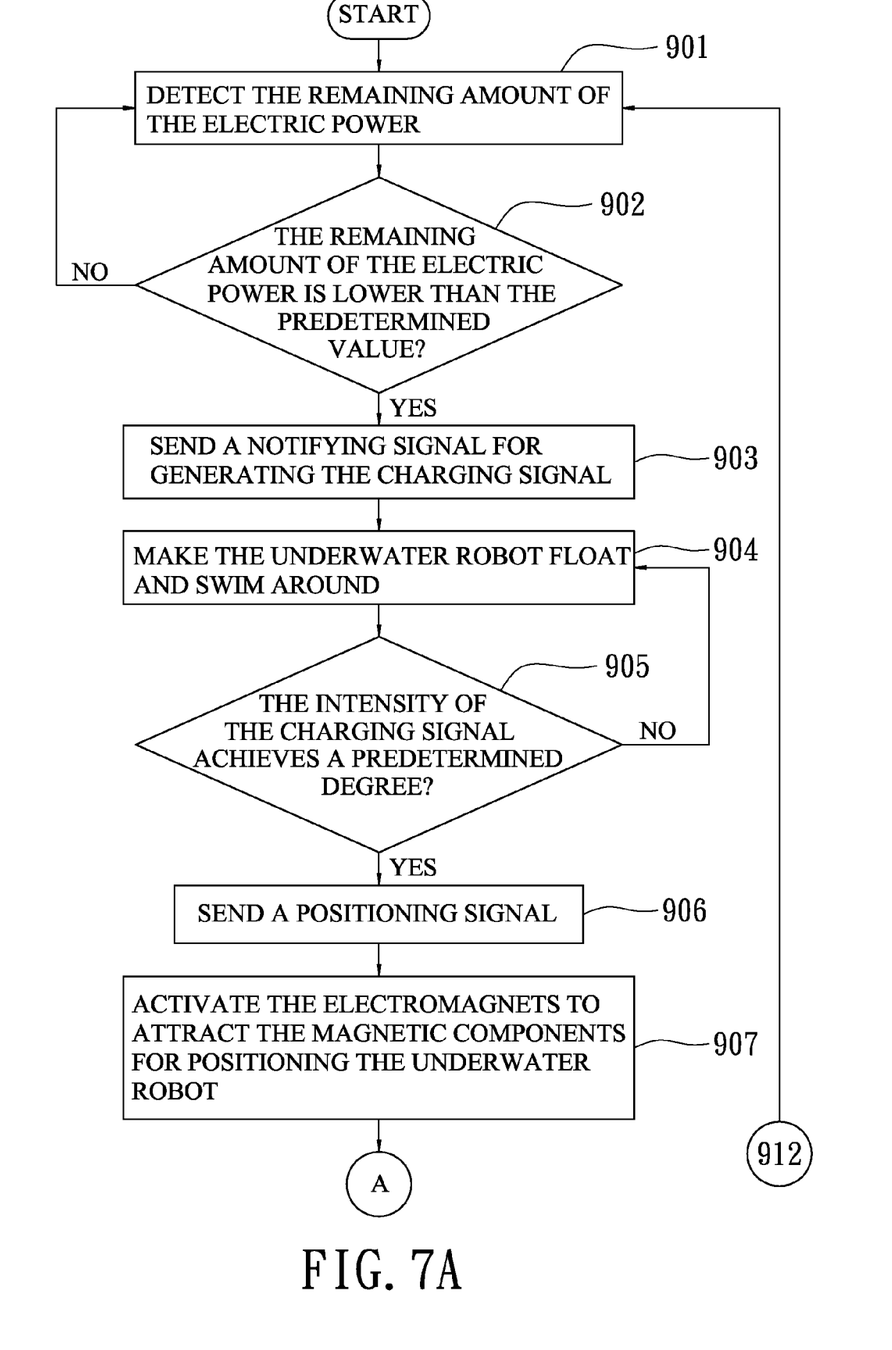
FIGS. 7A and 7B are a flow chart illustrating a self-charging procedure of the underwater robot.
Figure 7B:
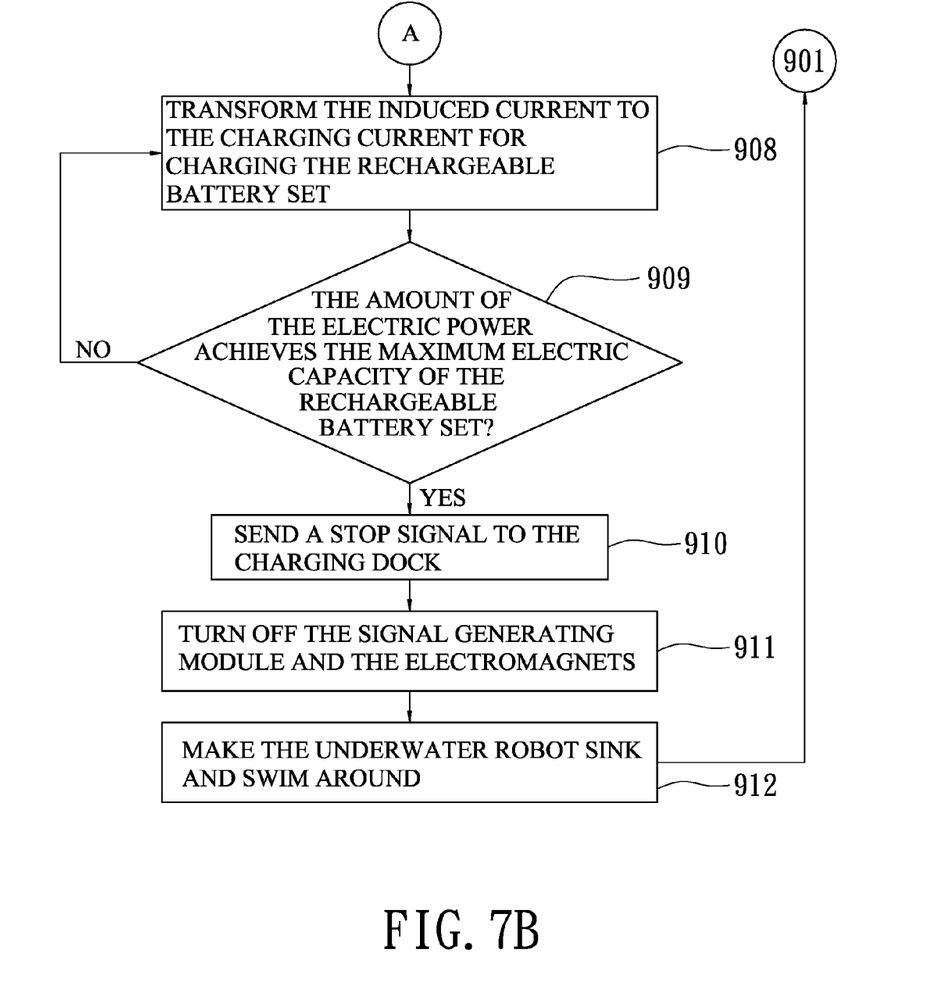

Referring to FIGS. 7A and 7B, during swimming in the aquarium 100, the underwater robot 1 is configured to automatically implement the self-charging procedure for detecting the remaining amount of the electric power stored by the rechargeable battery set 51 and for charging the rechargeable battery set 51 when the remaining amount of the electric power is lower than the predetermined value.

During the self-charging procedure, the control unit 41 is operable to detect the remaining amount of the electric power stored by the rechargeable battery set 51 in step 901, and to determine whether the remaining amount of the electric power stored by the rechargeable battery set 51 is lower than the predetermined value in step 902. For example, the predetermined value is 10% of maximum electric capacity of the rechargeable battery set 51.

When the determination made in step 902 is affirmative, the control unit 41 is operable, in step 903, to control the signal transmitter 61 of the signal transceiving unit 6 of the underwater robot 1 to send the notifying signal to the signal receiver 85 of the charging dock 8, and then the signal generating module 81 is operable to generate the charging signal. Otherwise, the control unit 41 is operable to implement step 901 when it is determined in step 902 that the remaining amount of the electric power stored by the rechargeable battery set 51 is not lower than the predetermined value.

In step 904, the control unit 41 is operable to control operation of the propulsion unit 3 to make the underwater robot 1 float and swim in the aquarium 100.

In step 905, the control unit 41 is operable to determine whether the intensity of the charging signal received by the charging module 53 of the electric power unit 5 of the underwater robot 1 achieves a predetermined degree, that is to say, the underwater robot 1 is close enough to the charging dock 8.

The flow goes to step 906 when the determination made in step 905 is affirmative, and goes back to step 904 when otherwise.

In step 906, the control unit 41 is operable to control the signal transmitter 61 of the signal transceiving unit 6 to send a positioning signal to the signal receiver 85 of the charging dock 8. In step 907, the electric power management circuit 83 of the charging dock 8 is operable to provide the processed electric current to the electromagnets 84 in response to the receipt of the positioning signal by the signal receiver 85 such that the electromagnets 84 generate magnetic force and the magnetic components 54 are attracted by the electromagnets 84 so as to position the underwater robot 1 with respect to the charging dock 8.

After positioning the underwater robot 1, the control unit 41 is operable, in step 908, to control the transformation circuit 52 to transform the induced current, which is generated by the charging module 53 from the charging signal (magnetic field) generated by the signal generating module 81, to the charging current for charging the rechargeable battery set 51.

In step 909, the control unit 41 is operable to determine whether the amount of the electric power stored by the rechargeable battery set 51 achieves the maximum electric capacity thereof. The flow goes to step 910 when the determination made in step 909 is affirmative, and goes back to step 908 when otherwise.

In step 910, the control unit 41 is operable to control the signal transmitter 61 of the underwater robot 1 to send a stop signal to the signal receiver 85 of the charging dock 8. In step 911, the electric power management circuit 83 of the charging dock 8 is operable, in response to receipt of the stop signal, to stop providing the processed electric current to the signal generating module 81 and the electromagnets 84 so as to turn off the signal generating module 81 and the electromagnets 84. Thus, in step 912, the underwater robot 1 is operable to sink and to swim underwater in the aquarium 100 after the electromagnets 84 are turned off.

Figure 8:
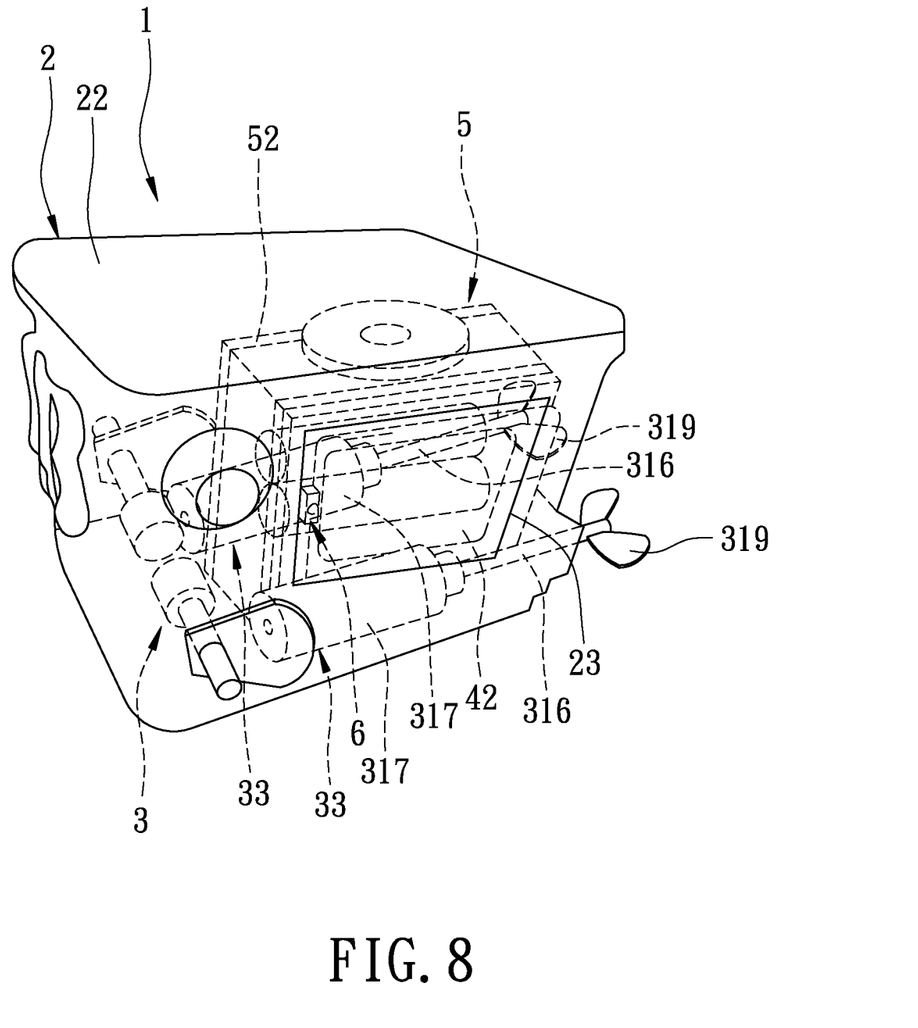
FIG. 8 is a perspective view of an underwater robot of a second preferred embodiment of this invention.

Referring to FIG. 8, the second preferred embodiment of the underwater robot 1 according to this invention is similar to the first preferred embodiment. In this embodiment, the caudal fin module 32 of the propulsion unit 3 and the sensor unit 7 are omitted, and the main body 2 of the underwater robot 1 merely includes the waterproof chamber 22 without the fish-shaped housing 21. The propulsion unit 3 includes a pair of rear propulsion module 33 each of which includes a second motor 317, a second shaft 316 connected to and driven by the second motor 317 to rotate, and a propeller 319 connected to and driven by the second shaft 316 to rotate so as to generate linear propulsion force.

In summary, by virtue of the charging dock 8 and the charging module 53, the underwater robot 1 may automatically implement the self-charging procedure for charging the rechargeable battery set 51 within the aquarium 100, and it is not required to take the underwater robot 1 of this invention out of the aquarium 100 during the self-charging procedure. Further, the display unit 42 is operable to display information.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An underwater robot configured to be charged in response to a charging signal from a charging dock, the charging dock including a coil configured to generate a magnetic field serving as the charging signal, said underwater robot comprising:
    a main body including a waterproof chamber;
    an electric power unit disposed in said waterproof chamber, said electric power unit including a rechargeable battery set storing electric power and a charging module coupled to said rechargeable battery set and configured to charge said rechargeable battery set in response to the charging signal from the charging dock;
    a propulsion unit disposed on said main body and configured to generate a propulsion force to make said underwater robot move underwater; and
    a control unit disposed in said waterproof chamber and coupled to said electric power unit and said propulsion unit, said control unit being operable to provide the electric power from said electric power unit to said propulsion unit and to control operation of said propulsion unit;
    wherein said charging module of said electric power unit is a coil configured to generate induced current from the magnetic field generated by the charging dock, and said electric power unit further includes a transformation circuit coupled between said charging module and said rechargeable battery set and configured to transform the induced current to a charging current for charging said rechargeable battery set.

2. The underwater robot as claimed in claim 1, the charging dock further including at least one electromagnet,
    wherein said electric power unit further includes at least one magnetic component configured to be attracted by the electromagnet of the charging dock so as to position said underwater robot with respect to the charging dock in such a manner that said charging module of said electric power unit is adjacent to the coil of the charging dock.

3. The underwater robot as claimed in claim 1, the charging dock including a signal receiver,
    wherein said underwater robot further comprises a signal transmitter coupled to said control unit, and said control unit is operable to detect a remaining amount of the electric power stored by said rechargeable battery set, and to control said signal transmitter to send a notifying signal for reception by the signal receiver of the charging dock and for notifying the charging dock to generate the charging signal when the remaining amount of the electric power stored by said rechargeable battery set is lower than a predetermined value.

4. The underwater robot as claimed in claim 1, wherein said waterproof chamber of said main body is made of a transparent material, said main body further includes a transparent display section, and said underwater robot further comprises a display unit disposed in said waterproof chamber at a location corresponding to said transparent display section and coupled to said control unit.

5. The underwater robot as claimed in claim 4, further comprising a signal receiver disposed in said waterproof chamber of said main body adjacent to said display unit, coupled to said control unit, and configured to receive information and to send the information to said control unit that is operable to control said display unit to display the information.

6. The underwater robot as claimed in claim 1, further comprising a sensor unit coupled to said control unit and configured to detect whether there is an obstacle in front of said underwater robot and to send a detection signal to said control unit, said control unit being operable to control operation of said propulsion unit according to the detection signal.

7. The underwater robot as claimed in claim 6, wherein said sensor unit is an ultrasonic module including a transmitter and a receiver, and said sensor unit further includes a waterproofing layer that is disposed on said transmitter and said receiver and that has an acoustical transmission coefficient equal to acoustical transmission coefficient of water.

8. An underwater robot system comprising:
a charging dock configured to generate a charging signal, and including a coil configured to generate a magnetic field serving as the charging signal; and
an underwater robot including
a main body including a waterproof chamber,
an electric power unit disposed in said waterproof chamber, said electric power unit including a rechargeable battery set storing electric power and a charging module coupled to said rechargeable battery set and configured to charge said rechargeable battery set in response to the charging signal from said charging dock,
a propulsion unit disposed on said main body and configured to generate a propulsion force to make said underwater robot move underwater, and
a control unit disposed in said waterproof chamber and coupled to said electric power unit and said propulsion unit, said control unit being operable to provide the electric power from said electric power unit to said propulsion unit and to control operation of said propulsion unit;
wherein said charging module of said electric power unit is a coil configured to generate induced current from the magnetic field generated by said charging dock, and said electric power unit further includes a transformation circuit coupled between said charging module and said rechargeable battery set and configured to transform the induced current to a charging current for charging said rechargeable battery set.

9. The underwater robot system as claimed in claim 8, wherein said charging dock further includes at least one electromagnet, and said electric power unit further includes at least one magnetic component configured to be attracted by said electromagnet of said charging dock so as to position said underwater robot with respect to said charging dock in such a manner that said charging module of said electric power unit is adjacent to said coil of said charging dock.

10. The underwater robot system as claimed in claim 9, wherein said charging dock further includes a signal receiver, and said underwater robot further includes a signal transmitter coupled to said control unit, said control unit being operable to detect a remaining amount of the electric power stored by said rechargeable battery set, and to control said signal transmitter to send a notifying signal for reception by said signal receiver of said charging dock and for notifying said charging dock to generate the charging signal when the remaining amount of the electric power stored by said rechargeable battery set is lower than a predetermined value.

11. The underwater robot system as claimed in claim 10, wherein said signal transmitter of said underwater robot is operable to send a position signal to said signal receiver of said charging dock when said underwater robot is close to said charging dock and said charging module of said electric power unit detects the charging signal having a predetermined strength, and said charging dock is operable to provide electric power to said electromagnet so as to enable attraction between said electromagnet and said magnetic component of said electric power unit in response to the position signal.

12. The underwater robot system as claimed in claim 8, wherein said waterproof chamber of said main body is made of a transparent material, said main body further includes a transparent display section, and said underwater robot further comprises a display unit disposed in said waterproof chamber at a location corresponding to said transparent display section and coupled to said control unit.

13. The underwater robot system as claimed in claim 12, wherein said underwater robot further includes a signal receiver disposed in said waterproof chamber of said main body adjacent to said display unit, coupled to said control unit, and configured to receive information and to send the information to said control unit that is operable to control said display unit to display the information.

14. The underwater robot system as claimed in claim 8, wherein said underwater robot further includes a sensor unit coupled to said control unit and configured to detect whether there is an obstacle in front of said underwater robot and to send a detection signal to said control unit, said control unit being operable to control operation of said propulsion unit according to the detection signal.

15. The underwater robot system as claimed in claim 14, wherein said sensor unit is an ultrasonic module including a transmitter and a receiver, and said sensor unit further includes a waterproofing layer that is disposed on said transmitter and said receiver and that has an acoustical transmission coefficient equal to acoustical transmission coefficient of water.

* * * * *